United States Patent
Moreira et al.

(10) Patent No.: US 6,894,637 B2
(45) Date of Patent: May 17, 2005

(54) AIRBORNE OR SPACEBORNE TOMOGRAPHIC SYNTHETIC APERTURE RADAR (SAR) METHOD

(75) Inventors: Alberto Moreira, Olching (DE); Andreas Reigber, Seefeld (DE)

(73) Assignee: Deutsches Zentrum für Luft- und Raumfahrt e.V., Köln (DE)

(*) Notice: Subject to any disclaimer, the term of this patent is extended or adjusted under 35 U.S.C. 154(b) by 0 days.

(21) Appl. No.: 10/314,629

(22) Filed: Dec. 9, 2002

(65) Prior Publication Data

US 2003/0122700 A1 Jul. 3, 2003

(30) Foreign Application Priority Data

Dec. 10, 2001 (DE) .......................... 101 60 399

(51) Int. Cl.[7] ............................................. G01S 13/00
(52) U.S. Cl. ............................................. 342/22 R
(58) Field of Search .......................... 342/25 A–25 F, 342/25

(56) References Cited

U.S. PATENT DOCUMENTS

| | | | | |
|---|---|---|---|---|
| 4,675,677 A | * | 6/1987 | von Maydell et al. | 342/25 |
| 5,332,999 A | * | 7/1994 | Prati et al. | 342/25 R |
| 5,463,397 A | | 10/1995 | Frankot | |
| 5,677,693 A | | 10/1997 | Frankot | |
| 6,011,505 A | * | 1/2000 | Poehler et al. | 342/25 R |
| 6,011,625 A | * | 1/2000 | Glass | 356/496 |
| 6,388,606 B1 | | 5/2002 | Keydel et al. | |

FOREIGN PATENT DOCUMENTS

DE 19938592 3/2001

OTHER PUBLICATIONS

"First Demonstration of Airborne SAR Tomography Using Multibaseline L–Band Date" Andreas Reigber and Albert Moreira.

"A Helicopter–Borne Eight–Channel Ranging Scatterometer for Remote Sensing" Part I: System Description Martti Hallikainen, et al.

"Synthetic aperture radar interferometry" Richard Bamler and Philipp Hartl.

* cited by examiner

Primary Examiner—Thomas H. Tarcza
Assistant Examiner—Brian Andrea
(74) Attorney, Agent, or Firm—Collard & Roe, P.C.

(57) ABSTRACT

By means of tomograhic radar technique consisting of a coherent combination of large numbers of synthetic aperture radar images acquired by several air or space SAR systems having different look angles, a real three-dimensional imaging of volume scatterers is achieved. This allows the separation of the backscattered signal of volume scatterers in the height direction which can be further evaluated independently. The invention can be put to use in the three-dimensional analysis of vegetation layers and ground strata, but also for imaging and mapping of buildings, urban areas and mountainous terrain.

11 Claims, 10 Drawing Sheets

AIRBORNE OR SPACEBORNE TOMOGRAPHIC SYNTHETIC APERTURE RADAR (SAR) METHOD

FIELD OF THE INVENTION

The invention relates to a tomographic synthetic aperture radar (SAR) method operating with an airborne or spaceborne radar sensor for three-dimensional object imaging in which a true three-dimensional image is obtained by coherent combination of a plurality of SAR sensor images obtained at differing viewing angles. The backscatter contributions of volume targets are separated in elevation and can be analyzed each independent of the other.

BACKGROUND

Imaging radar methods operate with an active radar sensor which, by means of radiating and receiving electromagnetic waves in the microwave range, generates a reflectivity map of the illuminated area. In recent years synthetic aperture radar (SAR) has attained major significance in remote sensing due to the high resolution and rich information content of SAR images. In addition to traditional applications in geography and in topographical and thematic mapping, SAR sensors also find application nowadays in many other fields such as e.g. in oceanography, agriculture and forestry, urban planning, ecology as well as in the forecasting and evaluating natural disasters.

One salient property of SAR methods materializes from the propagation properties of microwaves. Due to their long wavelength they are able to penetrate vegetation and even the ground down to a certain depth, depending on the wavelength as well as on the dielectric constant and density of the object concerned. Radiation of shorter wavelength, such as X band radiation, exhibits a strong attenuation and is backscattered primarily by the upper portions of the vegetation, whereas radiation of longer wavelength, such as L and P band typically penetrates deeper into the vegetation cover and ground. Backscatter thus contains contributions of all layers attained by the radiation.

One main problem in analyzing conventional SAR images of longer wavelengths is the layover of several backscatter contributions. Although a certain backscatter contribution of interest is buried in the data, this is often inaccessible since it is only the backscatter as a whole that can be sensed. Another problem is establishing the precise vertical position of the backscatter location, which is unknown since SAR geometry as a whole exhibits symmetry in elevation. This is why the elevation angle or the topographical elevation of the backscatter cannot be resolved by a conventional SAR method.

One known imaging SAR method is the so-called SAR interferometry (INSAR) as described in the paper R. Bamler and P. Hartl: "Synthetic Aperture Radar Interferometry", Inverse Problems, Volume. 14, pages R1–R54, 1998, which is understood to be a technique by which the phase difference between two SAR images, taken at slightly different positions, is evaluated. This phase difference is a function of the elevation angle involved and thus of the topography of the terrain concerned. This permits generating highly accurate digital elevation models (DEMs) from INSAR images in which the elevation of a mean scatter center is decisive for each pixel of the image.

Making use of various wavelengths or polarizations opens up the additional possibility of determining the elevation of a plurality of scatter centers characteristic for each wavelength or polarization concerned; this can be used in determining the thickness of vegetation layers. By inverting simple scatter models, further physical parameters, such as e.g. the attenuation constant, can be additionally determined.

SAR interferometry (INSAR) has, however, more particularly the disadvantage that it is exclusively the elevation of a mean scatter center that can be measured, i.e. this method fails to achieve true three-dimensional imaging. Thus where volume targets are concerned, layover of the various scatter centers continues to be a problem. This is why the INSAR method is unsuitable for a detailed analysis of volume targets. On top of this, INSAR measurements fail to be completely unambiguous, and a further processing step is needed, namely phase unwrapping, to eliminate these ambiguities.

Model-based approaches on the basis of polarimetric or multifrequent interferograms are restricted, in principle, to a few simple parameters in analyzing volume targets. Their scope of application is thus very limited. Apart from this, they greatly depend on the scatter model employed and are a total failure when the assumptions made fail to apply.

Another technique for analyzing three-dimensional objects is multi-pass tomography, as known from the paper by A. Reigber and A. Moreira: "First Demonstration of Airborne SAR Tomography using Multibaseline L-band Data", IEEE Trans. on Geoscience and Remote Sensing, Volume 38, No. 5, pages 2142–2152, September 2000. In this technique, a true three-dimensional image is obtained by coherent combination of a large number of SAR images at various viewing angles. The backscatter contributions of volume targets are separated in the elevation and can thus be analyzed each independently of the other. It is also possible to combine this technique with polarimetry to thus permit attaining indications not only as to the three-dimensional distribution of the scattering processes but also as to the type of the scattering process concerned in each case.

The main problem in multi-pass tomography is the extremely high experimental complications involved. Only with a large number of parallel passes (>10) good resolution coupled with a good information content, is attainable. This necessitates lengthy flight times for a relatively small imaged portion. Since the relative distances between the passes need to be known to within a millimeter for data processing, the multi-pass technique makes high demands on the positioning of the sensor. These requirements have hitherto been satisfied only to an inadequate extent. In conclusion, the unavoidable lack of uniformity in the distribution of the passes greatly restricts the quality of imaging. This is why multi-pass tomography is to be appreciated only as functional verification of airborne SAR tomography.

Known further from U.S. Pat. No. 5,463,397 A is a SAR interferometry system as a combination of multi-pass interferometry with successive dual-antenna SAR interferometry to obtain elevation maps with an accuracy unobtainable by either method alone. However, here too, the disadvantages of the multi-pass tomography as described above occur.

Separating the backscatter contributions in accordance with the elevation can also be achieved by the radar pulses emitted vertically downwards, as described in the paper by M. Hallikainen, J. Hyyppa, J. Haapanen, T. Tares, P. Ahola, J. Pulliainen, M. Toikka: "A helicopter-borne eight-channel ranging scatterometer for remote sensing—Part 1: System Description", IEEE Trans. On Geoscience and Remote Sensing, Volume. 31, No. 1, pages 161–169, 1993. Here, unlike in the two methods as described above, resolving elevation is achieved by delay measurement of the radar.

Although a good elevation resolution is achievable by downwards emitted radar pulses, the three-dimensional resolution is poor. The swath of such an image needs to remain narrow to permit a near vertical angle of incidence, thus making large-area imaging impossible.

It is very similar to this that light detection and ranging (Lidar) sensors offer the basic possibility of three-dimensional object analysis. Here, instead of microwave pulses, short laser pulses are emitted vertically downwards, precise delay measurement in turn making elevation resolution possible. Thus, both methods enable profiles along the pass of the sensor to be determined. Similar as for radar pulses emitted vertically downwards, Lidar systems too, permit achieving only a narrow swath, since otherwise a fringing angle of incidence would not permit penetration of the laser pulses down to the ground. However, even with vertical incidence a Lidar system depends on small clearances in a forest in being able to penetrate to the ground and is thus greatly dependent on the type of forest concerned. Clouding too, prevents application of the Lidar system. In general, Lidar is only suitable for measuring the height of vegetation; it cannot be used for three-dimensional volume analysis.

SUMMARY OF THE INVENTION

The invention is based on an airborne or spaceborne SAR configuration which is able to perform a three-dimensional imaging of volume scatterers. This involves, for instance, three-dimensional analysis of the backscatter contribution of vegetation layers, determining their layer thickness and biomass, as well as correcting for falsification in the backscatter of the ground located underneath caused by vegetation. Being able to determine the topographic elevation from the elevation angle of the backscatter, precise and free of ambiguities, would also open up possible applications in three-dimensional imaging and mapping of buildings, urban areas and mountainous terrain.

In accordance with the invention relating to a tomographic radar method of the aforementioned kind, this object is achieved by the various viewing directions being formed by a set of SAR antennas each working independently of the other in simultaneous operation. Unlike the known multi-pass tomography, as explained above, in which the various viewing angles are achieved by repeated passes in parallel, in the method in accordance with the invention a set of independent SAR antennas is operated simultaneous instead. The method as proposed by the invention eliminates the disadvantages experienced in multi-pass tomography.

The method in accordance with the invention offers a number of advantages. For one thing, it now makes it possible to unambiguously determine the origin of all scatter contributions, irrespective of assumptions as to the imaged objects. The method in accordance with the invention permits true three-dimensional imaging of the site being remotely sensed. A single pass is all that is needed for complete data acquisition in thus greatly reducing the operational expense whilst avoiding unequal distribution of the passes and the attendant poor imaging quality. Likewise avoided is a temporal decorrelation during data acquisition.

Advantageous further embodiments and aspects of the invention read from the sub-claims relating back to claim 1 either directly or indirectly.

In the case of airborne radar sensors the various viewing directions are formed by individual SAR antenna elements of an antenna array, fixedly secured to the aircraft each relative to the other in a fixed physical relationship in simultaneous operation. Fixedly securing the antenna elements to the aircraft reduces the requirements on the absolute position of the sensor to a reasonable degree. The relative spacing vectors between the antenna elements can be exactly defined in designing the sensor.

The radar sensor in the method in accordance with the invention is operated as a rule side-looking.

One variant of the method in accordance with the invention is to operate such a sensor forwards-looking instead of side-looking to thus achieve high elevation resolution even with a small antenna array. The long synthetic aperture materializing from the forwards movement of the sensor results in a very high elevational resolution in the forwards-looking direction. A high range resolution results from the delay sensing of the radar itself. In the direction perpendicular to the movement direction of the sensor in the horizontal plane, the resolution is related to the length of the real aperture of the antenna array perpendicular to the direction of flight.

Another variant of the method in accordance with the invention is downwards-looking operation. In this case, the long synthetic aperture in the direction of flight produces a high azimuthal resolution; the elevational resolution materializes from the delay sensing of the radar. Perpendicular to the direction of movement of the sensor higher resolution is obtained by the real aperture of the antenna array in this direction.

Where spaceborne sensors are concerned, a fixedly secured antenna array cannot be put to use since the sizes for such an antenna array are of the order of several kilometers. Instead of a fixedly secured antenna array, this can only be achieved by an adequate arrangement of physically separated sensors. Where satellite-borne radar sensors are concerned, the various viewing directions are thus formed to advantage by simultaneous operation of the individual SAR antennas of receivers on physically separated satellites of a cluster thereof moving in unison, transmission being made by one satellite of the cluster.

One variant of the method in accordance with the invention is the extension of the cartwheel concept of D. Massonet (WO 99/58997) to a larger number of satellites for implementing three-dimensional object imaging. By distributing the receiving satellites sufficiently expanded in space high-quality imaging is achievable also over great distances.

BRIEF DESCRIPTION OF THE DRAWINGS

The invention will now be detailed by way of example embodiments with reference to the drawings in which.

DETAILED DESCRIPTION

Figure 1:
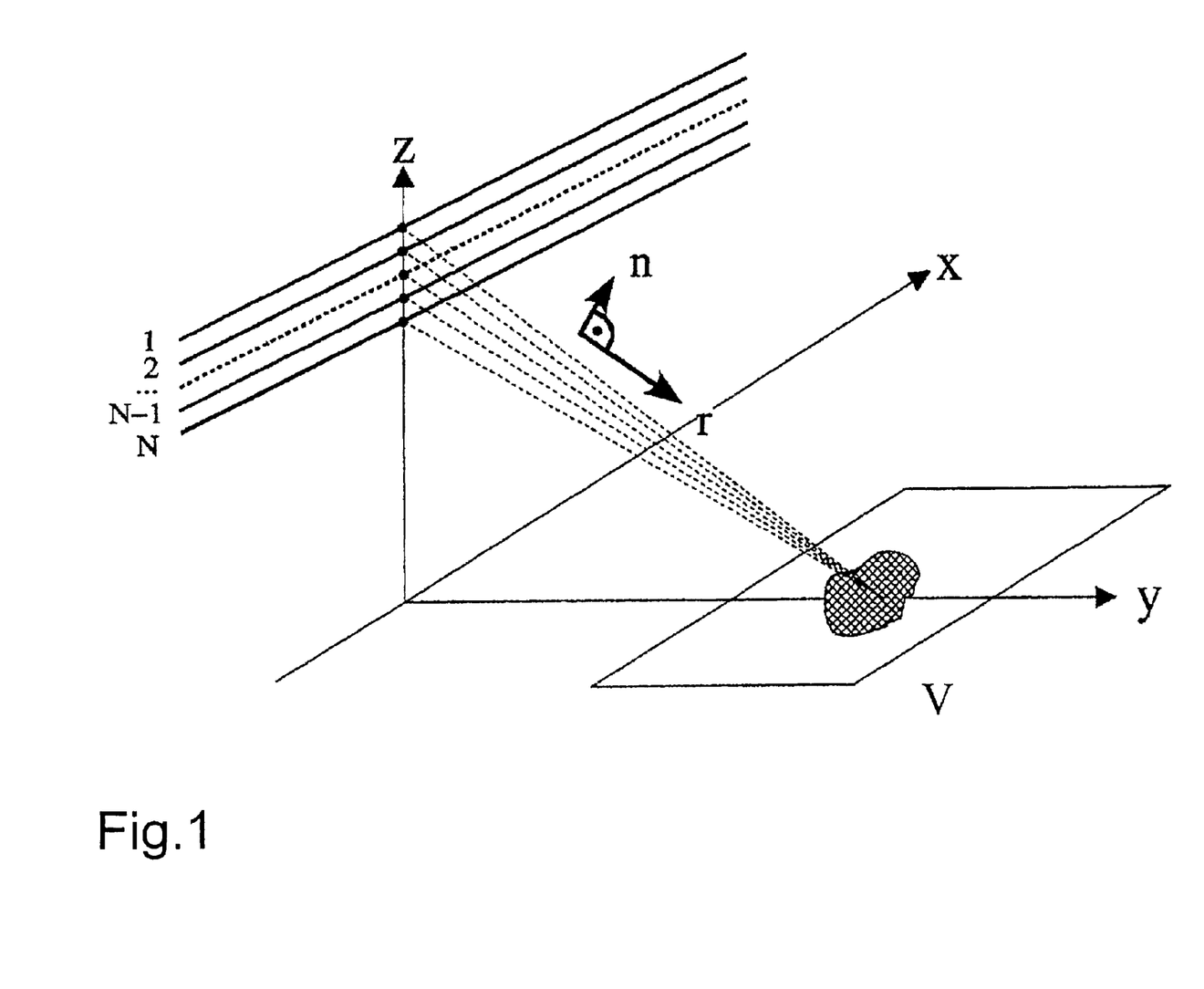
FIG. 1 is an illustration showing the imaging geometry for three-dimensional object imaging in a side view, an antenna array observing a volume target from various viewing angles.

Referring now to FIG. 1 there is illustrated in a Cartesian x-y-z-system of coordinates the basic geometry of a radar sensor in a side view for three-dimensional object imaging. The movement of the sensors is to be imagined parallel along the x axis. The various independent antenna elements of an antenna array are arranged so that each thereof (paths 1,2 . . . N-1, N of the antenna elements) views the scene and thus the volume targets V at a different angle.

Figure 2:
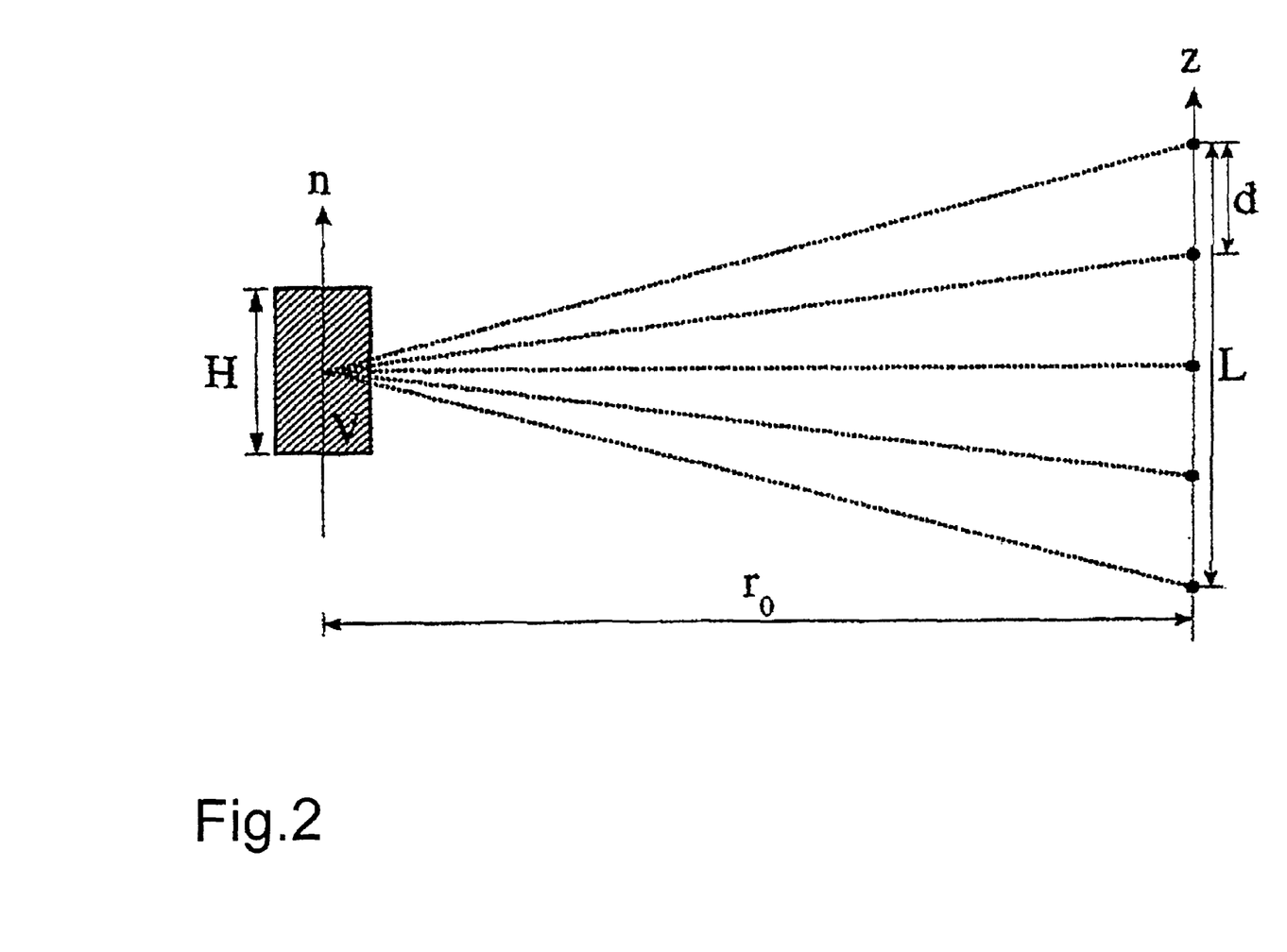
FIG. 2 is an illustration showing a simplified tomographic imaging geometry.

Referring now to FIG. 2 there is illustrated a simplified geometry in which an array of antenna elements has the aperture length L and the center-spacing of the antenna elements is d and the mean angle of incidence is 0°, i.e. the n axis as shown in FIG. 1 is parallel to the z direction. In this geometry the spacing between a scatter at the elevation $n_0$ and the antenna element at the position z is $$r(z, n_0) = 2\sqrt{r_0^2 + (z-n_0)^2} \approx 2r_0 + \frac{(z-n_0)^2}{r_0} \quad (1)$$

The signal $s_r(z, n_0)$ received by this antenna element can thus be modeled as follows:

$$s_r(z, n_0) = a(n_0) \exp\left(-\frac{ik}{r_0}(z-n_0)^2\right), \quad (2)$$

where $k=2\pi/\lambda$ is the wave number of the emitted waves and $a(n_0)$ is the complex reflectivity at elevation $n_0$. An approach similar to that of the SPECAN method is useful for processing. When this signal is multiplied by a deramping function u(z)

$$u(z) = \exp\left(+\frac{ik}{r_0}z^2\right), \quad (3)$$

then a signal materializes whose wave number in the z direction is no longer a function of z but merely of the elevation of the scatter $n_0$:

$$s_d(z, n_0) = a(n_0)\exp\left(-\frac{ik}{r_0}(n_0^2 - 2zn_0)\right). \quad (4)$$

so that the spectral $k_z$ range is proportional to the spatial n range in conjunction with the relation $k_z=2kn_0/r_0$. Thus, by a Fourier transformation in the z direction the imaging result $v(n, n_0)$ is:

$$v(n, n_0) = FT_z(s_d(z, n_0)) = a(n_0)L \exp\left(\frac{-ikn_0^2}{r_0}\right)\sin c\left(\frac{kL}{r_0}(n_0 - n)\right). \quad (5)$$

Resolving this imaging result in the n direction is attained from the first zero positions of the "Sinus Cardinalis" function and is $$\delta_n = \frac{\lambda r_0}{2L}. \quad (6)$$

For instance, a system in the L band at an altitude of 500 m and a total extent of the antenna array of 30 m would produce a resolution of roughly 3 m.

Also to be taken into account is the center-spacing d of the individual antenna elements. So that the signal spectrum generated by a volume of elevation H is sufficiently sampled, the requirement $$d \leq \frac{\lambda r_0}{2H} \quad (7)$$

need to be satisfied, otherwise serious ambiguities materialize within the volume analyzed.

The resolutions in range and along the pass are identical to those of a conventional SAR sensor and are $c\tau/2$ and $L_{az}/2$ respectively where c is the speed of light, $\tau$ the pulse duration and $L_{az}$ is the length of the antenna in the direction of flight.

Figure 3A:
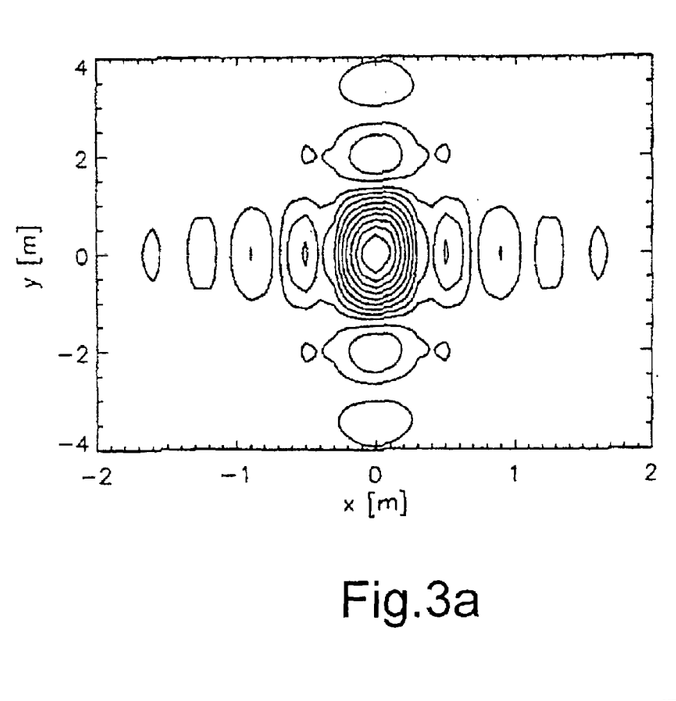
FIG. 3 is an illustration showing in two plots (FIG. 3a and FIG. 3b) the simulated pulse responses of a side-looking tomographic radar sensor.
Figure 3B:
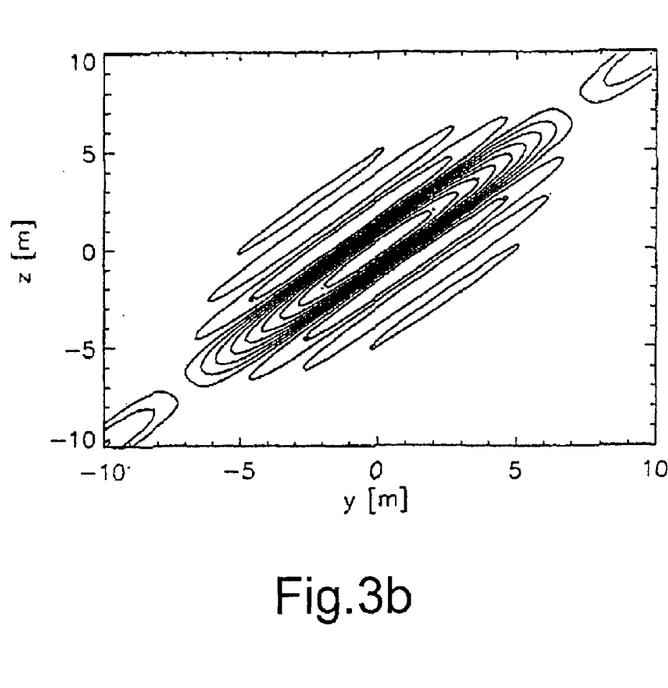

Referring now to FIG. 3a and FIG. 3b there are illustrated in the x-y and y-z plots respectively the simulated pulse responses of a side-looking tomographic radar sensor working in accordance with the invention. The system parameters for this simulation are: L band, 150 MHz bandwidth, 1000 m altitude, length of the antenna array $L_y$=25 m with 30 elements, azimuthal synthetic aperture 500m and squint angle $\chi$=0°.

Figure 6:
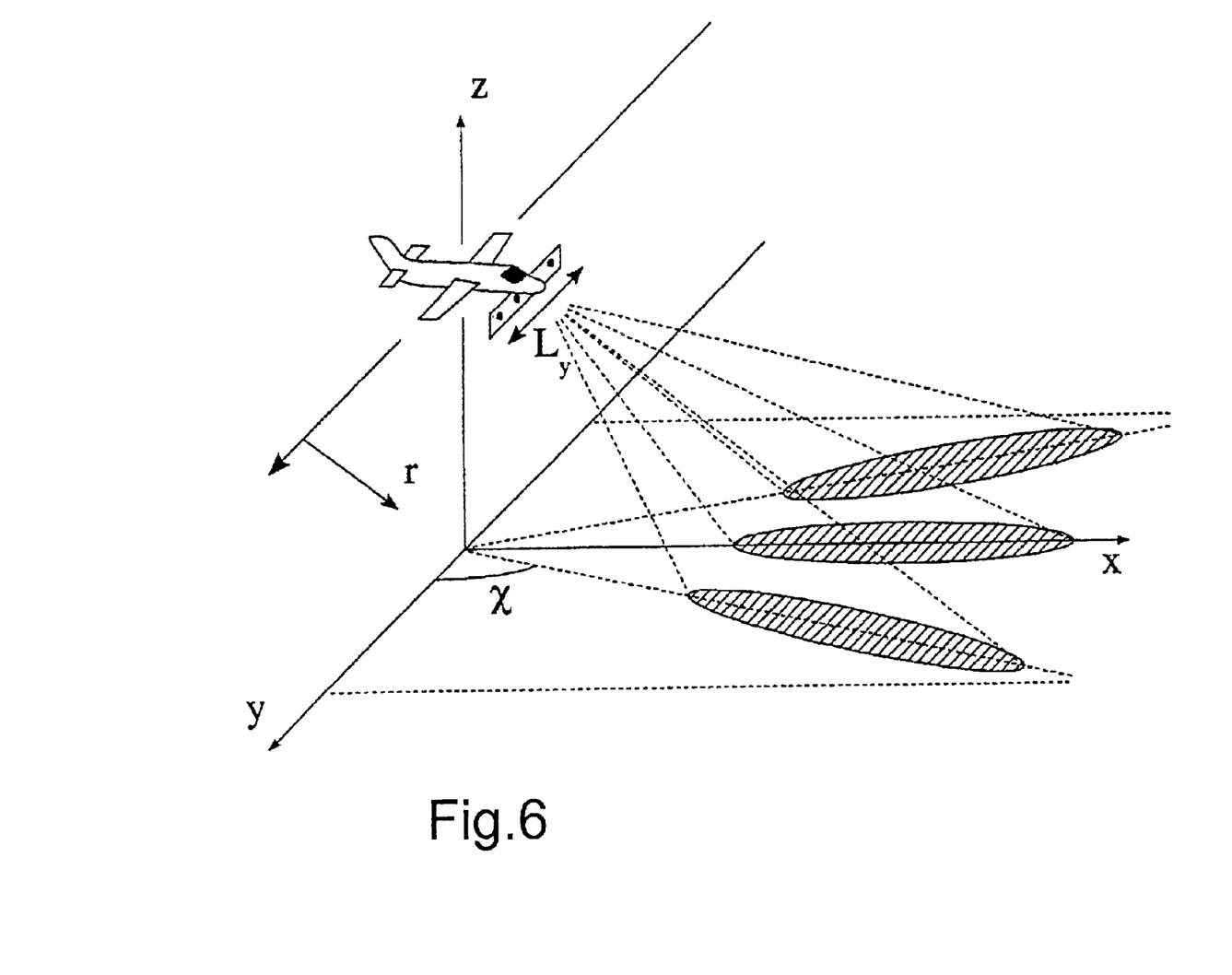
FIG. 6 is an illustration showing the imaging geometry in principle of an airborne forwards-looking tomographic radar sensor.
Figure 7:
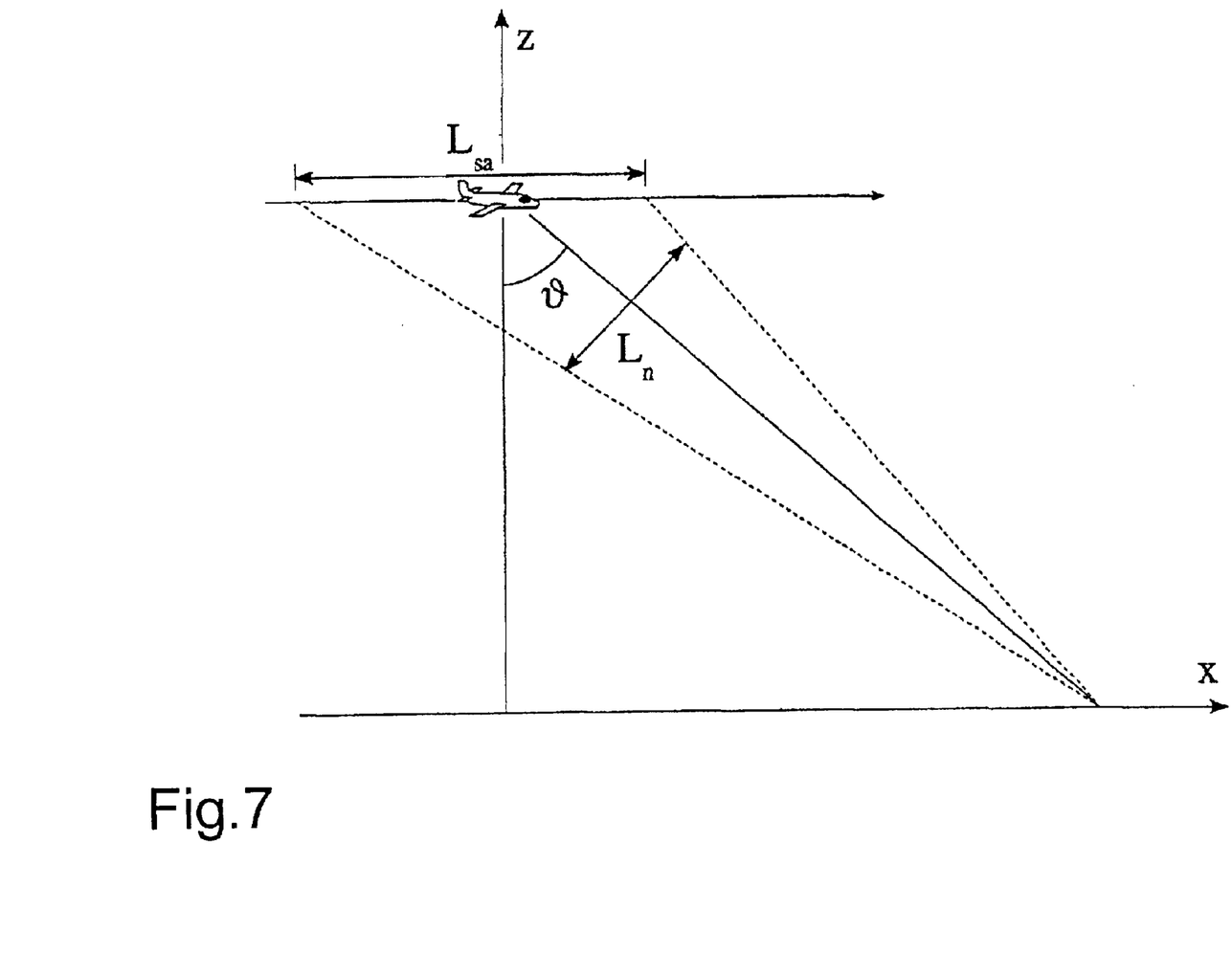
FIG. 7 is an illustration showing the imaging geometry of an airborne forwards-looking tomographic radar sensor illustrating the aperture lengths.

Referring now to FIG. 6 and FIG. 7 there is illustrated the imaging geometry in principle of an airborne forwards-looking radar sensor working by a method in accordance with the invention. Deriving the elevational resolution is analogous to that as described above. In this case, however, it is not the extent of the antenna array but the projection of the synthetic aperture in the direction of flight on the direction perpendicular to the viewing direction that decides focusing, as is evident from FIG. 7. Its length $L_n$ depends on the off Nadir angle $\theta$ and $L_n=L_{sa} \cos(\theta)$. With the same quadratic approach as in equation (1) and in using $L_n=\lambda\cos(\theta)/L$ we have $$\delta_n = \frac{\lambda r_0}{2L_n} = \frac{L}{2 \cos \vartheta}, \quad (8)$$

where L is the real aperture of the antenna in the direction of flight. Similar to the situation with conventional SAR in the direction of flight, this resolution no longer depends on the range. This is why the resolutions achievable are comparable to conventional azimuthal resolutions and may attain one meter or less with no problem. The problem of sampling lacking uniformity and undersampling as involved in multipass tomography can be ignored in this case, since strong oversampling of the data is achievable also for large volume thickness due to a more or less constant flight velocity and a sufficiently high pulse repetition frequency.

Available in the y direction is only the real length $L_y$ as formed by the antenna array. The resolution in this direction can be derived the same as above. Since the resolution materializes from a real aperture, it is a function of the range and attains its maximum value in the direct forwards direction (squint angle χ=90°). On the sides, with sinking squint, the resolution is also diminished since the effective aperture is reduced:

$$\delta_y = \frac{\lambda r_0}{2L_y \cos(\chi)}. \quad (9)$$

Due to the limited extent of the antenna array and the range dependency of the resolution, $\delta_y$ is relatively slight for usual system parameters. Despite this, an acceptable resolution is achievable with a relatively low altitude and small size of the antenna array. For example, an antenna array having an overall length of 5 m exhibits in a range of 1,000 m a resolution of 25 m.

Figure 4A:
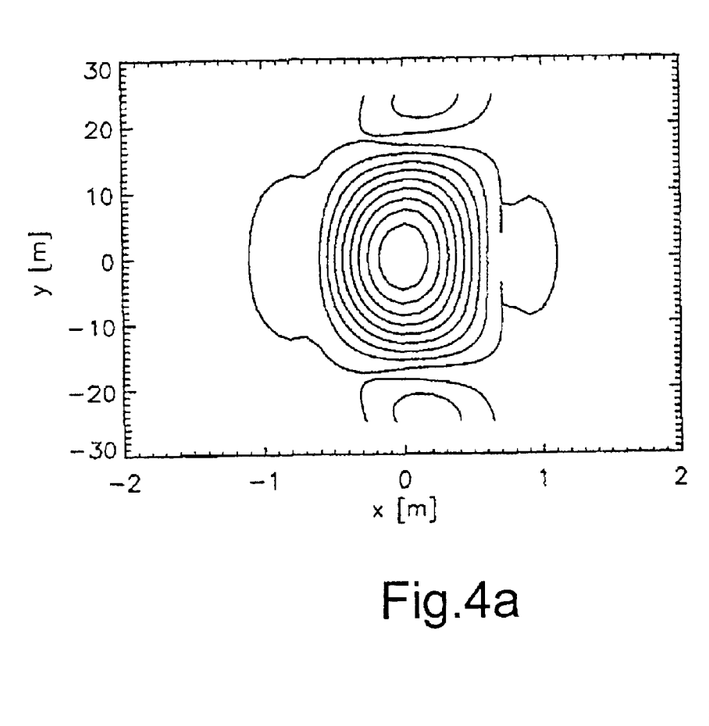
FIG. 4 is an illustration showing in two plots (FIG. 4a and FIG. 4b) the simulated pulse responses of a forwards-looking tomographic radar sensor.
Figure 4B:
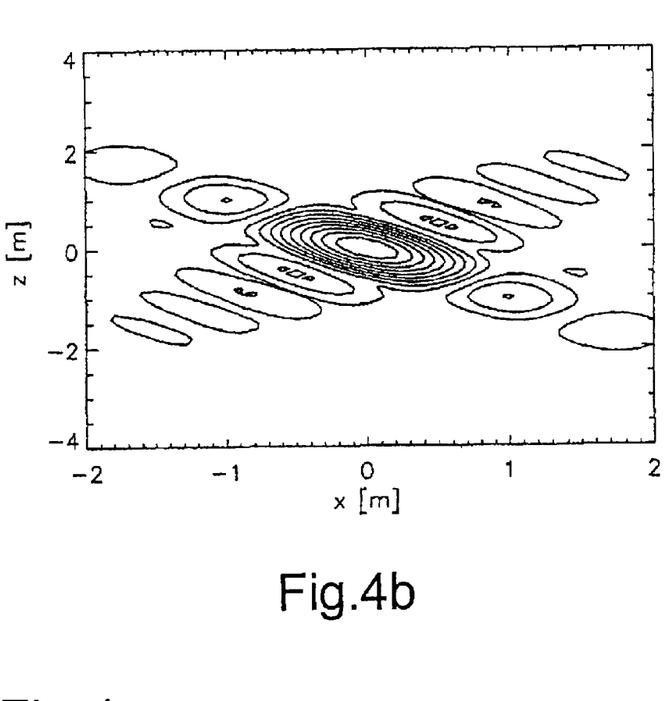

Referring now to FIG. 4a and FIG. 4b there is illustrated in an x-y plot and x-z plot respectively the simulated pulse responses of a forwards-looking tomographic radar sensor working in accordance with the invention. The system parameters for this simulation are: L band, 150 MHz bandwidth, 1,000 m altitude, length of antenna array $L_y$=10 m with 20 elements, azimuthal synthetic aperture 500m and a squint angle χ=90°.

The results for the downwards-looking variant are similar, except that the elevation resolution in this case is dictated purely by the accuracy of the delay measurement. The resolution in the direction of flight corresponds to that of a conventional SAR sensor; perpendicular to the direction of flight, equation (9) again applies, where χ represents the side-looking angle. Simulated pulse responses are shown in FIG. 3c.

Figure 5A:
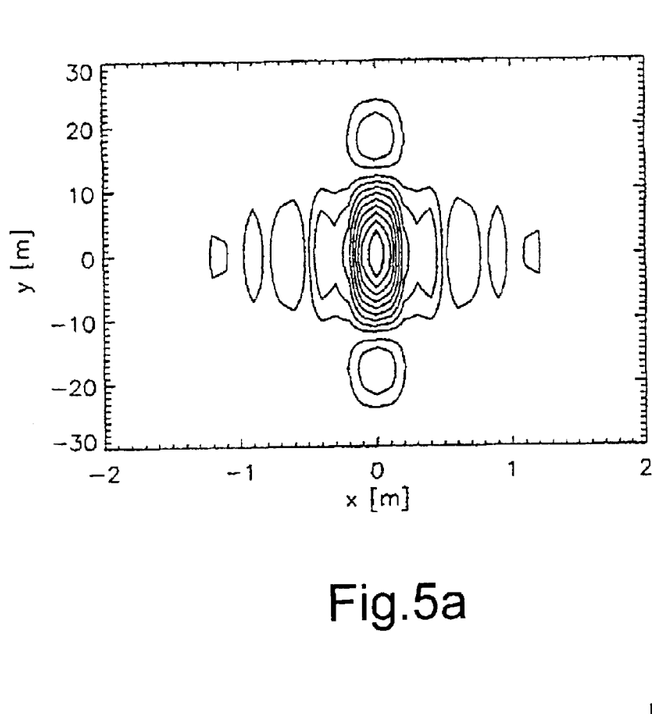
FIG. 5 is an illustration showing in two plots (FIG. 5a and FIG. 5b) the simulated pulse responses of a downwards-looking tomographic radar sensor.
Figure 5B:
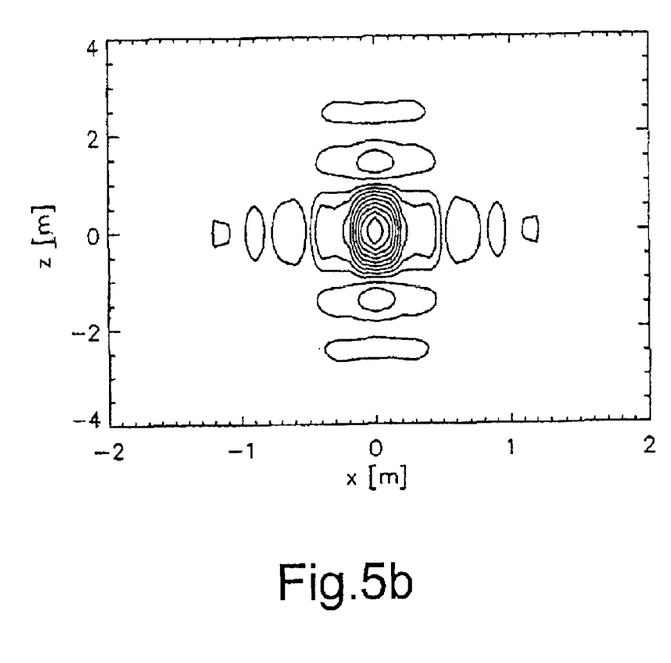

Referring now to FIGS. 5a and 5b there is illustrated in an x-y plot and x-z plot respectively the simulated pulse responses of a downwards-looking tomographic radar sensor working in accordance with the invention. The system parameters for this simulation are: L band, 150 MHz bandwidth, 1,000 m altitude, length of antenna array $L_y$=10 m with 20 elements, azimuthal synthetic aperture 500m and a squint angle χ=90°.

Figure 8:
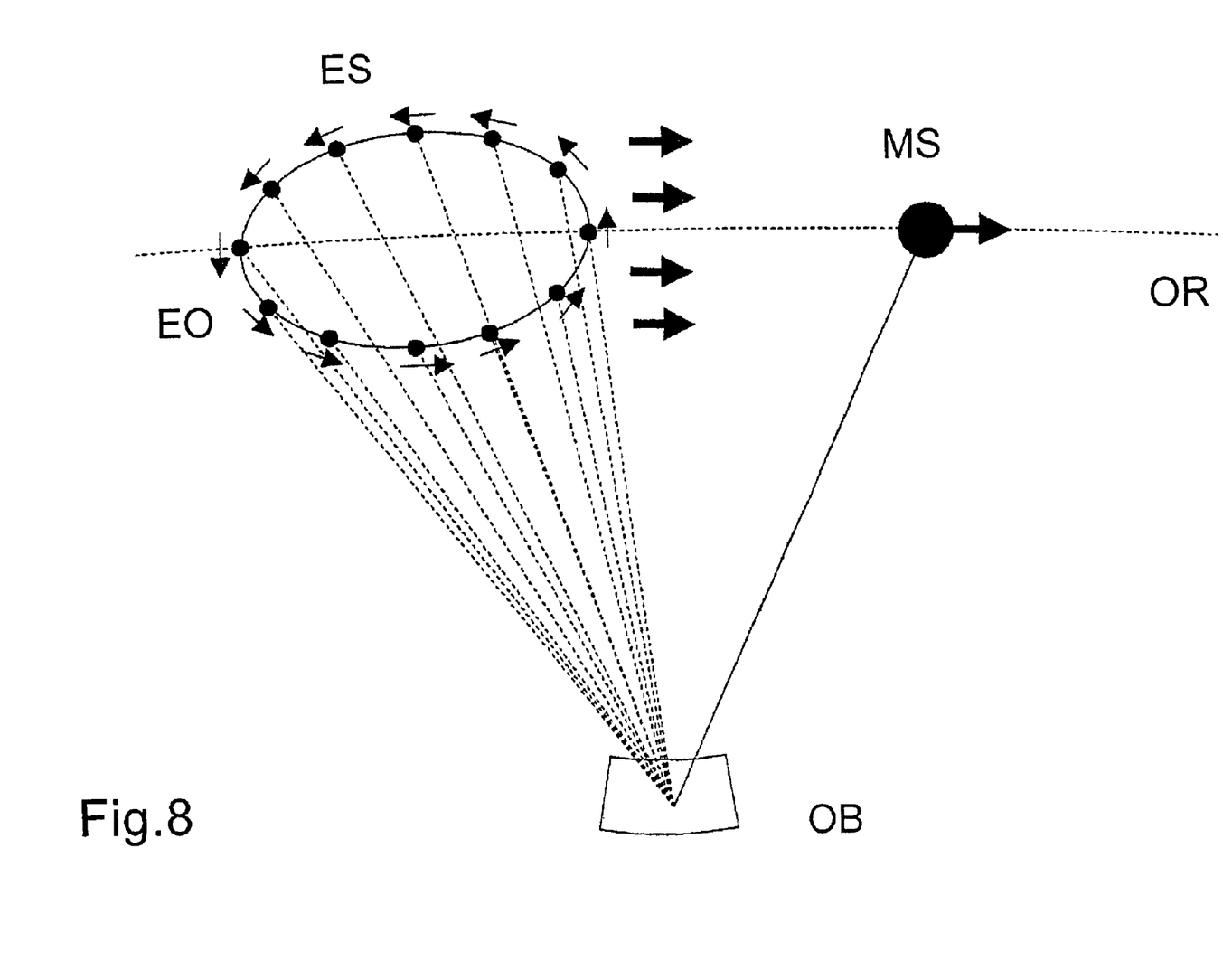
FIG. 8 is an extension of the cartwheel concept working in accordance with the method in accordance with the invention for three-dimensional object imaging from spaceborne sensors.
Figure 9:
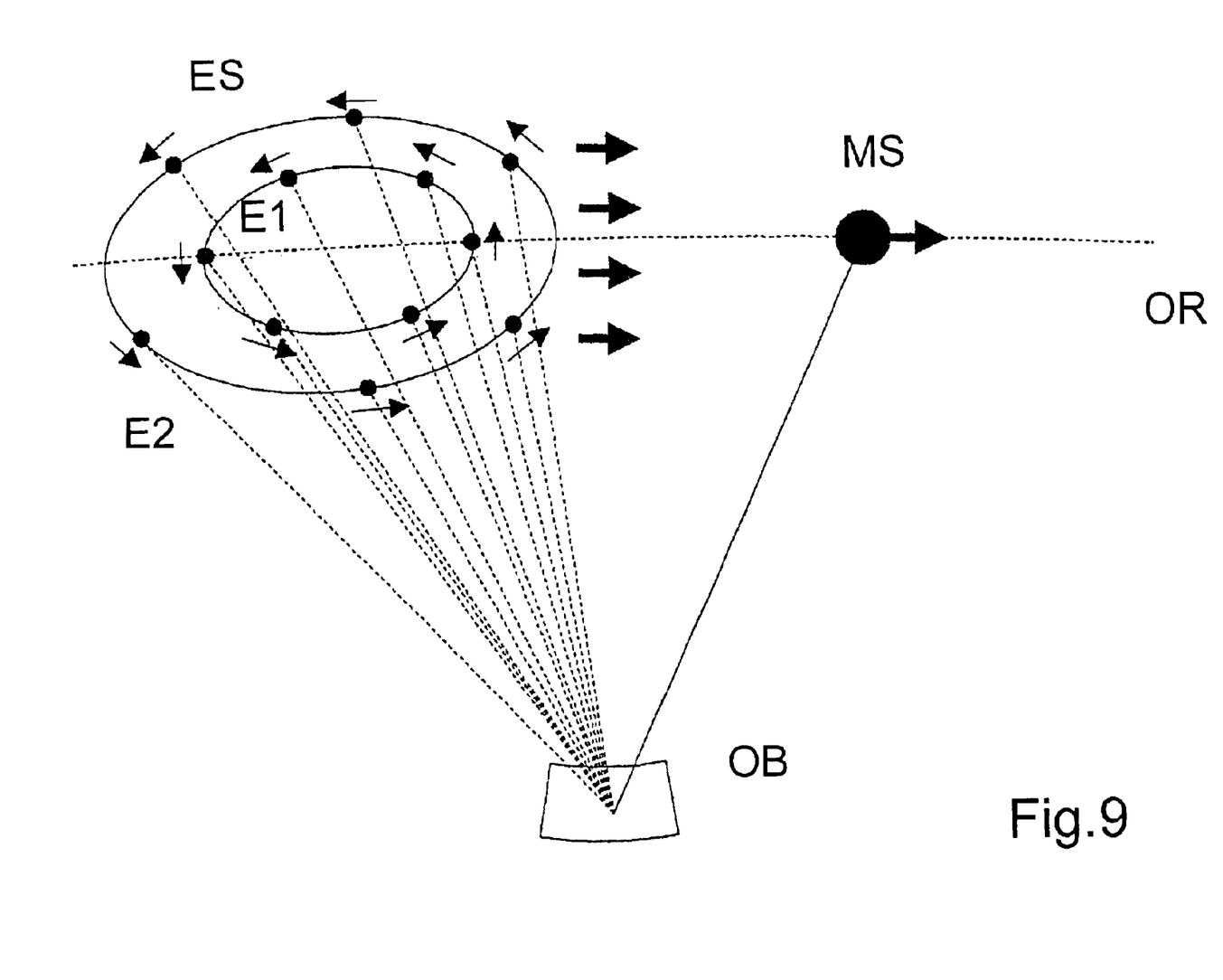
FIG. 9 is another extension of the cartwheel concept working in accordance with the method in accordance with the invention for three-dimensional object imaging from spaceborne sensors.

Referring now to FIG. 8 and FIG. 9 there are illustrated two different possibilities for an extension of the spaceborne cartwheel concept working by the method in accordance with the invention. In this concept a transmitting master satellite MS is followed by a plurality of receiving satellites ES which receive the signals backscattered by the object OB following irradiation by the master satellite MS. Suitably setting the orbit OR, in which the satellites ES and MS achieve stable motion, the receiving satellites in FIG. 8 and FIG. 9 will form an appropriate configuration flying equispaced on an ellipse E0 behind or ahead of the master satellite MS. Arranging a larger number of receiving satellites ES in one or more cartwheels located parallel to each other in a single plane following the master satellite MS permits achieving multiple viewing angles on the object. In the example aspect as shown in FIG. 9 the receiving satellites move on two cartwheel ellipses E1 and E2 following the master satellite MS.

Figure 10:
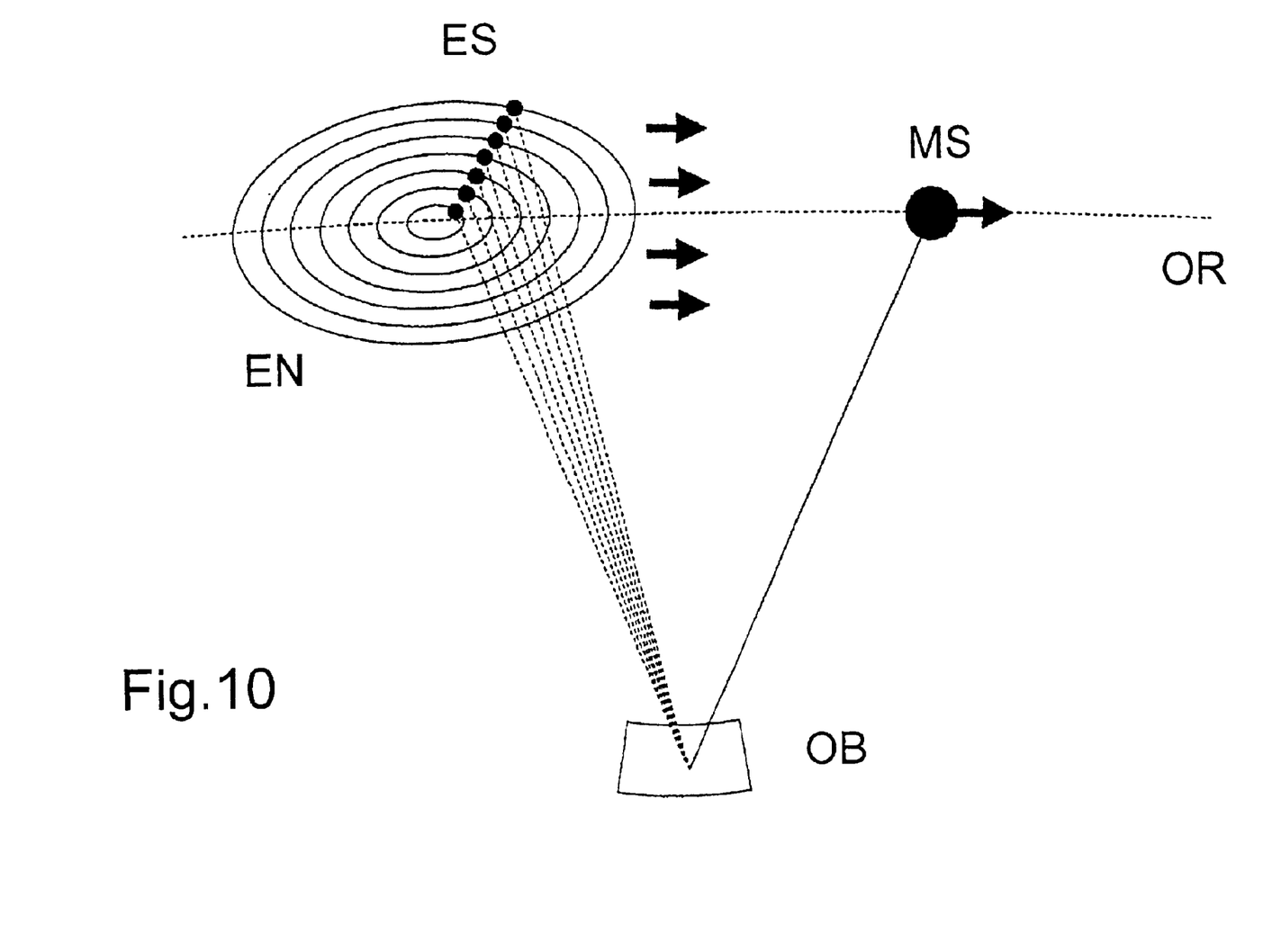
FIG. 10 is yet another extension of the cartwheel concept working in accordance with the method in accordance with the invention for three-dimensional object imaging from spaceborne sensors, achieving a uniform distribution of the various viewing angles.

Referring now to FIG. 10 there is illustrated another possibility of extending the spaceborne cartwheel concept working by the method in accordance with the invention. In this case, only a single receiving satellite ES orbits on each of several cartwheel ellipses oriented parallel to each other in a single plane. All of the receiving satellites ES are located on a common focus beam of all ellipses E0 and follow the master satellite on the orbit OR.

A cartwheel system works side-looking and thus the elevational resolution is given by equation (6). In this case, the aperture length L is the diameter of the complete arrangement. For example, a cartwheel system in the L band at an altitude of 500 km would require a diameter of approx. 30 km for an elevational resolution of 3 m, necessitating in an arrangement as shown in FIG. 10 a total of 10 satellites to image a volume with a thickness of 30 m free of ambiguities.

What is claimed is:

1. A tomographic synthetic aperture radar (SAR) method operating with an airborne or spaceborne radar sensor for three-dimensional object imaging, in which a true three-dimensional image is obtained by coherent combination of a plurality of SAR sensor images obtained at differing viewing directions onto the object, and the backscatter contributions of volume targets are separated in elevation and analyzed each independent of the other, wherein various viewing directions are formed by a set of SAR antennas each working independently of the other in simultaneous operation.

2. The radar method as set forth in claim 1 wherein in the case of airborne radar sensors the various viewing directions are formed by individual SAR antenna elements of an antenna array, fixedly secured to the aircraft each relative to the other in a fixed physical relationship in simultaneous operation.

3. The radar method as set forth in claim 1 wherein, in the case of spaceborne radar sensors the various viewing directions are formed by simultaneous operation of said individual SAR antennas of receivers on physically separated satellites of a cluster thereof moving in unison, transmission being made by a master satellite.

4. The radar method as set forth in claim 3, wherein on an orbit (OR) a transmitting master satellite (MS) is followed by a plurality of receiving satellites (ES) and the orbit of the satellites is so that said receiving satellites achieve stable motion in following said master satellite equispaced on a single ellipse (E0) or on a plurality of ellipses each parallel to the other (E1, E2, EN) in a single plane.

5. The radar method as set forth in claim 4 wherein several receiving satellites (ES) each orbiting on an ellipse (E0, E1, E2) move mutually equispaced.

6. The radar method as set forth in claim 4 wherein a receiving satellite (ES) orbits on each of several ellipses (EN) in parallel in a single plane and said receiving satellites are located on a common focusing beam of all ellipses.

7. The radar method as set forth in claim 1 wherein said radar sensors are operated side-looking.

8. The radar method as set forth in claim 1 wherein said radar sensors are operated forwards-looking.

9. The radar method as set forth in claim 2 wherein said radar sensors are operated forwards-looking.

10. The radar method as set forth in claim 1 wherein said radar sensors are operated downwards-looking.

11. The radar method as set forth in claim 2 wherein said radar sensors are operated downwards-looking.

* * * * *